United States Patent [19]

Aoki et al.

[11] 4,456,929
[45] Jun. 26, 1984

[54] SOLID STATE IMAGE PICK-UP APPARATUS

[75] Inventors: Masakazu Aoki, Kodaira; Haruhisa Ando, Hachioji; Shinya Ohba, Kanagawa; Iwao Takemoto, Tokyo, all of Japan

[73] Assignee: Hitachi, Ltd., Tokyo, Japan

[21] Appl. No.: 385,005

[22] Filed: Jun. 4, 1982

[30] Foreign Application Priority Data

Jun. 5, 1981 [JP] Japan .................................. 56-85718

[51] Int. Cl.³ .............................................. H04N 3/15
[52] U.S. Cl. .................................... 358/213; 357/30
[58] Field of Search ....................... 358/212, 213, 44; 357/30, 31, 32; 250/211 J, 578

[56] References Cited

U.S. PATENT DOCUMENTS 4,360,833  11/1982  Kinoshita .............................. 358/213
4,407,010   9/1983  Baji ....................................... 358/213

Primary Examiner—Michael A. Masinick
Attorney, Agent, or Firm—Charles E. Pfund

[57] ABSTRACT

In a solid state image pick-up device of the type comprising a first semiconductor layer including a photoelectric conversion element array, and vertical and horizontal switching elements adapted to select the photoelectric conversion elements, a second semiconductor layer including a horizontal shift register for selecting the horizontal switching elements, a third semiconductor layer including a vertical shift register for selecting the vertical switching elements, the first, second and third semiconductor layers are insulated from each other, and gate voltage $V_{SMOS.L}$ impressed upon a gate electrode of a not selected horizontal switching element is made to satisfy a relation $V_{SMOS.L} \geq V_{WPD} + F_{FB}$ where $V_{WPD}$ represents a potential of the first semiconductor layer, and $V_{FB}$ a flat band voltage beneath gate electrodes of the horizontal switching elements.

6 Claims, 9 Drawing Figures

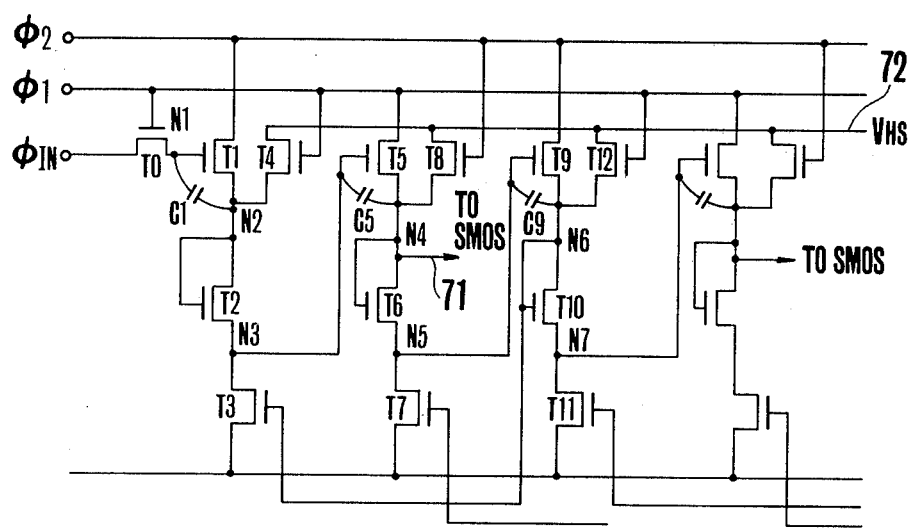
F I G.6
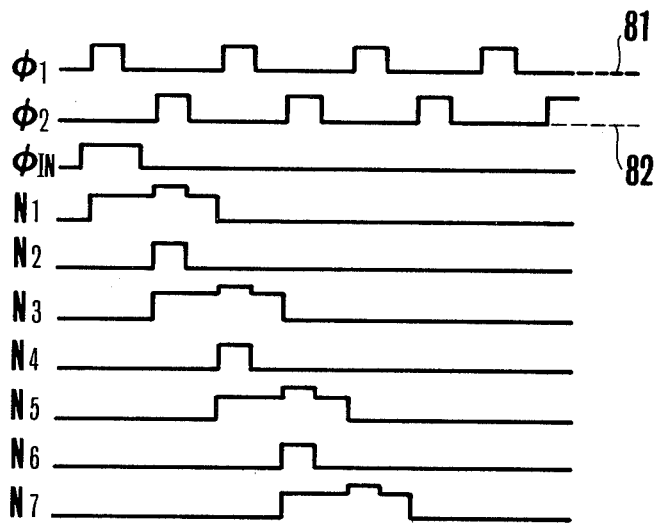
F I G.7

SOLID STATE IMAGE PICK-UP APPARATUS

BACKGROUND OF THE INVENTION

This invention relates to a solid state image pick-up apparatus and more particularly apparatus for decreasing a DC offset current of MOS type solid state image pick-up apparatus and for decreasing fixed pattern image caused by the DC offset current.

For the sake of description, in the following description, electrons are used as a signal charge, but it will be clear that holes can also be used as the signal charge provided that potential relation and conductivity type are reversed.

FIGS. 1A and 1B of the accompanying drawing shows the construction of a MOS type solid state image pick-up apparatus constituted by a plurality of photo diodes arranged in a matrix, vertical switching MOSFETs 9 (hereinafter called photogate circuits) and horizontal switching MOSFETs 4 (hereinafter called SMOS) associated with respective photodiodes 3 for the purpose of reading out signals stored therein, a vertical shift register 2 and a horizontal shift register 1 which are provided for the purpose operating these switching MOSFETs in a predetemined order, a vertical signal line 6 and a horizontal signal line 5 adapted to transmit signals. Transmission lines 8 are provided for the purpose of transmitting switching pulses to the gate electrodes of the SMOSs from the shift register 1, the transmission lines 8 being connected to output terminals 7. Switching pulses are transmitted to the gate electrodes of the photogate circuits 9 from the shift register 2 through transmission lines 10.

In the solid state image pick-up device, various elements described above are formed on semiconductor layers 12, 15 and 17 on a semiconductor substrate, not shown. The semiconductor layers on which the shift registers 1 and 2 and the photodiode array are formed respectively are electrically isolated from each other. The reason for providing the semiconductor layers and for electrically isolating them are discussed in detail in N. Koike et al paper, I.E.E.E. Trans. Electron Devices, ED-27, No. 8, pages 1676-1681, August 1980. For the purpose of decreasing noise and the impedances of the semiconductor layers, the horizontal signal lines 5 and the SMOSs4 shown in FIG. 1 are formed on the semiconductor layer of the diode array.

In the solid state image pick-up apparatus utilizing semiconductor layers, the fact that the semiconductor layer 17 for the vertical shift register 2 is electrically isolated from the semiconductor layer 12 for the photodiodes is utilized to forwardly bias the semiconductor layer 12 of the photodiode array for the purpose of preventing blooming of the photodiode array thereby making the gate voltage which turns OFF photogates 9 to be negative with respect to the voltage of the semiconductor layer 12 so as to render the gates to the charge accumulation state. The object and effect of this method are disclosed in detail in USP 4,223,330 invented by Koike et al.

However, it was recently found that the MOS type solid state image pick-up tube having excellent blooming suppression effect involves the following serious problems.

Firstly, when the apparatus is driven, independently of an electric signal caused by a photoinformation, a definite DC offset current flows. In apparatus utilizing electrons as signal carriers this current is in a direction of flowing out of the apparatus, but its direction is opposite to that of a generation current, normally termed as dark current. Further, this current does not result in a remarkable temperature change as the generation current.

Secondly, the DC offset current varies in a predetermined range in the horizontal direction. This variation is not caused by the charge and discharge of a capacitor as in the fixed pattern noise caused by flowing in and out of electric charge in the SMOSs which has been considered in the prior art MOS type solid state image pick-up apparatus but is a variation in direct current, so that it is impossible to eliminate such current by integrating varying charge. This greatly degraded signal to noise ratio (S/N) under a low light intensity condition, thus resulting in a serious problem for practical apparatus. The fixed pattern noise caused by charging and discharging of the capacitor described above, and a method of eliminating the noise are discussed in detail in M. Aoki et al paper, I.E.E.E. ISSOCC dig. Tech. Papers, 1980, pages 26 and 27, and S. Ohba et al paper, I.E.E.E. Trans. Electron Devices, ED-27, No. 8, pages 1682-1687, August 1980.

The reason of the above described phenomenon will be described with reference to FIG. 2 in which 21 designates a n type semiconductor substrate, 22 a p type semiconductor layer on which photodiodes and SMOSs are formed. In this example, the p type semiconductor layer comprises a p type wafer on the n-type substrate. Reference numeral 23 designates a n+ layer for forming a photodiodes, 24 a P+ layer for increasing a signal accumulation capacitance, 25 a drain electrode for reading out a signal stored in the photodiode, 28 a photo gate electrode, 30 a vertical gate line, 31 a vertical signal line, 29 a gate electrode of a SMOS, 26 and 27 are source and drain electrodes respectively of a SMOS, 32 a signal line for transmitting a pulse from the horizontal shift register to the SMOS gate electrode, and 23 a horizontal signal line.

Regarding the potential relation of the apparatus shown in FIG. 2, when the low level of a pulse applied to the photogate (the voltage in an OFF state) is made to be 0 V (reference), about 1 V ($V_{WPD}$), is impressed upon a well 22, more than 1 V ($V_{SUB}$) upon the n type substrate 21, 3 to 5 V acting as a video voltage upon signal lines 31 and 32, a high level voltage of 7 V ($V_{SMOS.H}$) and a pulse of low level of 0 V ($H_{SMOS, L}$) upon the gate electrode 29 of the SMOS.

When the elements are driven, direct current $I_{D1}$ flows as shown by an arrow 34 which is read by an ammeter 35. As above described, this direct current flows in a direction opposite to that of the generation current. When DC voltage of 0 to 10 V is applied to the gate electrode of the SMOS by stopping the operation of the horizontal shift register the direct current $I_{D1}$ decreases so that no fixed pattern noise caused by the variation of this direct current appers. When the drive frequency of the horizontal shift register is increased or decreased, the the direct current $I_{D1}$ also increases or decreases.

As the quantity of charge induced beneath the gate electrode of the SMOS is increased, that is as the voltage $V_{SMOS.H} - V_V$ is increased, the direct current $I_{D1}$ increases, when $V_{SMOS.H}$ represents the gate voltage when the SMOS is ON.

From the foregoing description, it can be assumed that the DC offset current described above is a charge pump current of the SMOS. When read with ammeters 36 and 37 shown in FIG. 2, it will be noted that the current is substantially equal to the current $I_{D2}$ flowing through ammeter 37. In other words, most of the charge pump current flows through the well 22. Since the depth of the well 22 is shallow that is less than 10 microns, if it were assumed that the current is caused by the discharge of the charge beneath the gate electrode like an ordinary charge pump current, the current would flow towards the substrate 21 due to bipolar effect. For this reason, it is considered that the observed charge pump current would be a recombination current produced by the recombination of electrons 38 on the sides of signal lines 31, 33 and holes 39 on the side of the semiconductor layer 22 through an interface at an interface level between Si and $SiO_2$ beneath the gate electrode of the SMOS as shown in FIG. 2.

The interface level is governed by the quality of the steps of manufacturing the image pick-up apparatus and can not be decreased readily. The fixed pattern noise caused by the variation in the direct current described above decreases the sensitivity of the pick-up device that is a television camera, thus greatly degrading the quality of the picture.

SUMMARY OF THE INVENTION

Accordingly, it is an object of this invention to provide a novel MOS type solid state image pick-up apparatus capable of reducing fixed pattern noise caused by direct current offset current and variation thereof thereby efficiently increasing the blooming suppression effect and sensitivity and decreasing noise.

According to this invention, there is provided solid state image pick-up apparatus comprising a first semiconductor layer including a photoelectric conversion element array, and vertical and horizontal switching elements adapted to select the photoelectric conversion elements, a second semiconductor layer including a horizontal shift register for selecting the horizontal switching elements, a third semiconductor layer including a vertical shift register for selecting the vertical switching elements, the first, second and third semiconductor layers being electrically insulated from each other, and means for causing gate voltage $V_{SMOS.L}$ impressed upon a gate electrode of a not selected horizontal switching element to satisfy a relation $$V_{SMOS.L} \geq V_{WPD} + V_{FB}$$

where $V_{WPD}$ represents a potential of the first semiconductor layer, and $V_{FB}$ a flat band voltage beneath gate electrodes of the horizontal switching elements.

BRIEF DESCRIPTION OF THE DRAWINGS

In the accompanying drawings:

FIG. 6 is a connection diagram showing one example of a horizontal shift register utilized in this invention;

FIG. 7 is a timing chart showing waveforms of various signals; and

DESCRIPTION OF THE PREFERRED EMBODIMENT

Figure 1A:
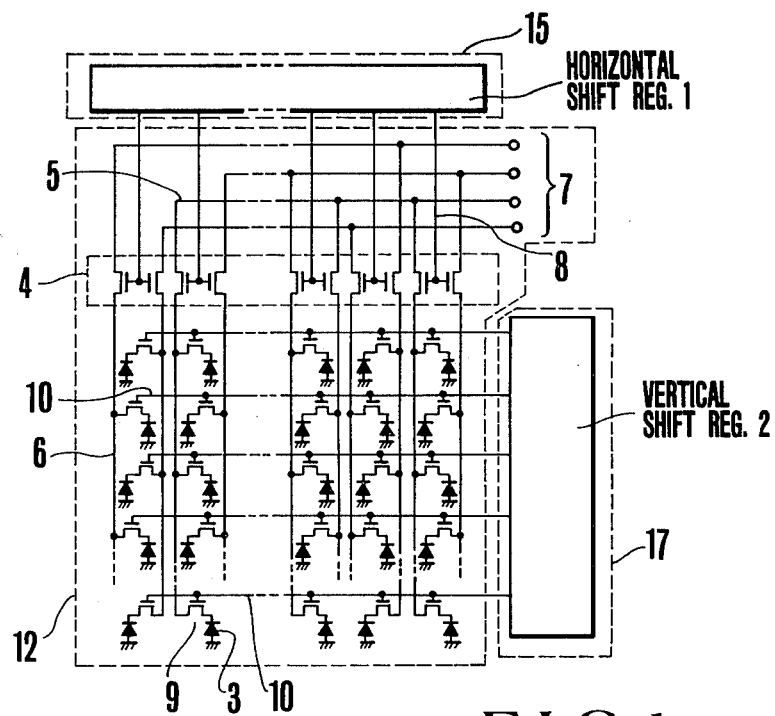
FIGS. 1A and 1B are connection diagrams showing the construction of a conventional MOS type solid state image pick-up apparatus.
Figure 1B:
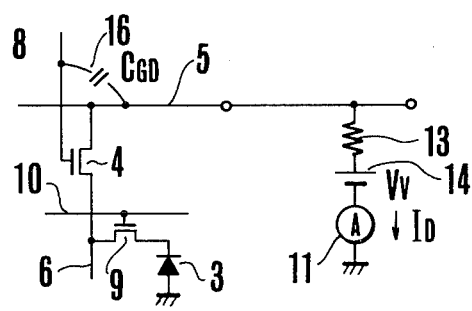
Figure 3:
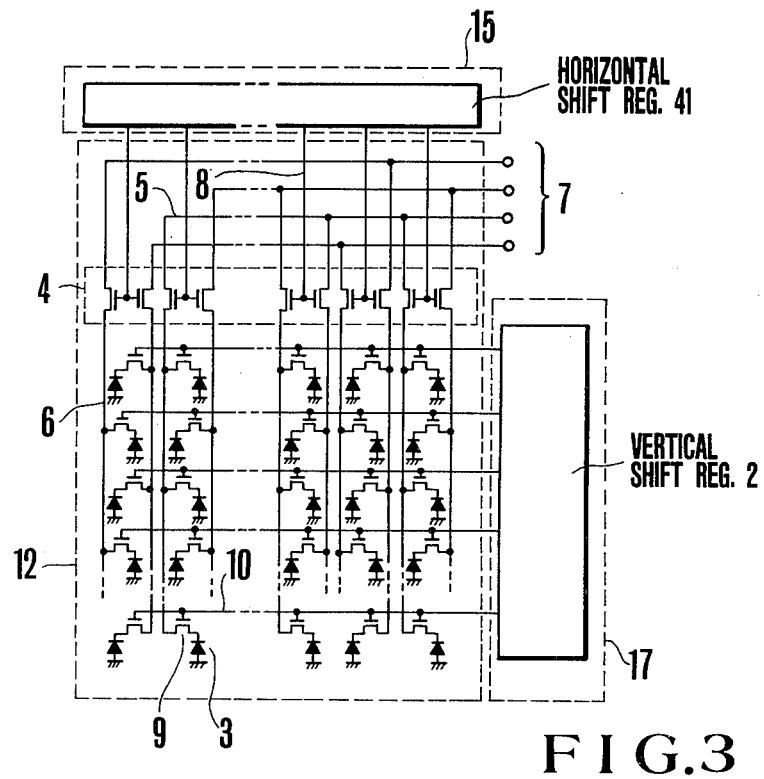
FIG. 3 is a connection diagram showing one embodiment of the solid state image pick-up apparatus according to this invention.

The invention will now be described with reference to FIGS. 3 and 4. In FIG. 3, elements 1 through 17 are identical to those shown in FIG. 1, but the invention is characterized by a shift register 41 which generates a drive pulse.

Figure 4:
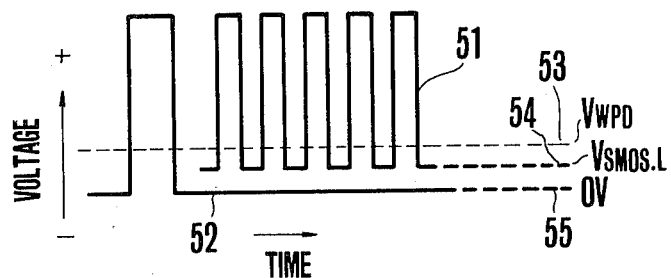
FIG. 4 is a graph showing the potential relation among a pulse and voltage levels of the image pick-up apparatus shown in FIG. 3.

In FIG. 4, a pulse sequentially applied to the gate electrodes of SMOSs 4 from the horizontal shift register 41 is shown by 51, while a pulse supplied to the photogates 9 from the vertical shift register 2 is shown by 52. $V_{WPD}$ (53) represents DC voltage applied to the semiconductor layer 12 of the photodiode array, a line 54 shows the low level $V_{SMOS.L}$ of the pulse applied to the gate electrodes of the SMOSs4, and a straight line 55 shows the low level applied to photogate, which is taken as a reference (0 V).

In FIG. 4, the low level $V_{SMOS.L}$ (54) of the pulse applied to the gate electrodes of the SMOSs4 has the following relation $$V_{WPD} - V_{SMOS.L} \geq V_{FB}$$

where $V_{FB}$ represents the flat band voltage of the gate electrodes of the SMOSs4.

Figure 2:
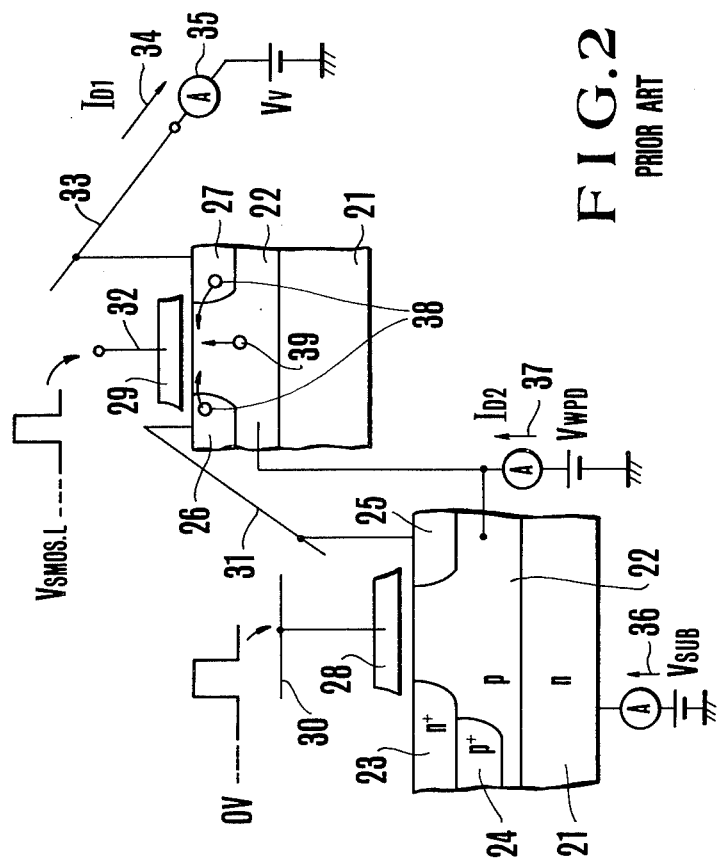
FIG. 2 is a diagrammatic representation useful to explain the cause of an offset current phenomenon.

So long as the relation (1) is satisfied holes in the semiconductor layer 12 would not be accumulated beneath the gate electrodes of the SMOSs4 so that recombination of electrons and holes described with reference to FIG. 2 would not occur. Consequently, DC offset current caused by the SMOSs4 does not flow and hence the fixed pattern noise caused thereby does not produced.

Figure 5:
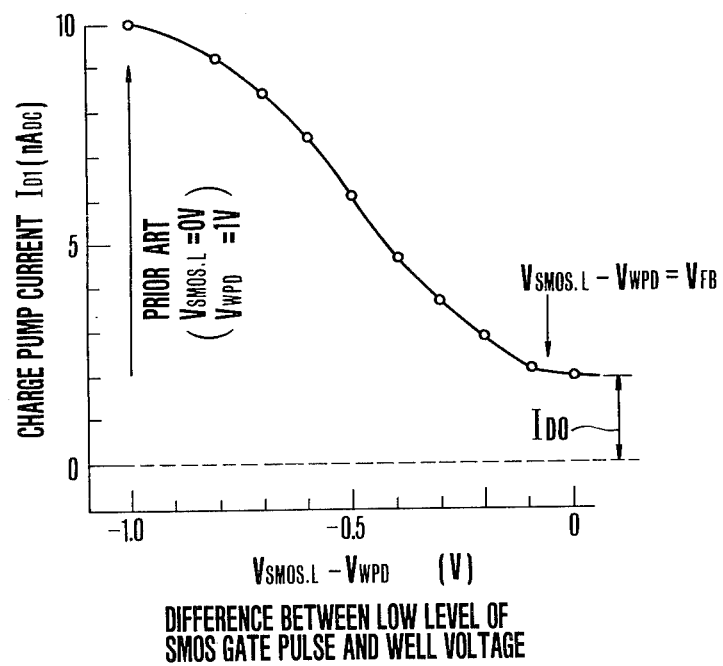
FIG. 5 is a graph showing the relation between the charge pump current and $V_{SMOS.L} - V_{WPD}$.

FIG. 5 is a graph showing the advantageous effect of this invention in which the ordinate represents the charge pump current (DC offset current) $I_{D1}$ and the abscissa the difference between the low level of the SMOS gate electrode $V_{SMOS.L}$ and the well voltage $V_{WPD}$. As can be noted from the graph, as the low level voltage $V_{SMOS.L}$ approaches the well voltage $V_{WPD}$, the charge pump current $I_{D1}$ decreases, and when $V_{SMOS.L}$ is larger than $V_{WPD} + V_{FB}$ (where $V_{FB} \approx 0.06$ V) the charge pump current is substantially constant. This residual current $I_{D0}$ corresponds to the charge pump current of the photodiode array (photo gate). The residual current can not be made zero because the blooming is suppressed by accumulating charge beneath the photogate electrode. However, since the drive frequency in the vertical direction is smaller than that in the horizontal direction by an order of more than 2, and since the gate electrode area is smaller than that of the SMOS gate electrode, the residual current is small. When the residual current has a small value as shown in FIG. 5 no external correction circuit is required or a simple one is sufficient.

Among the effects of this invention, the effect of decreasing the fixed pattern noise has been discussed. The fixed pattern noise (called a DC component) caused by the variation in the DC offset current is about 0.6 $nA_{PP}$. As the $V_{SMOS.L}$ approached $V_{WPD} + V_{FB}$, any appreciable fixed pattern noise was noted. In depicting the graph shown in FIG. 5, the stationary pattern noise was detected by subjecting the output signal to such processing as storing it in an external memory device, and as the fixed pattern noise caused by accumulation and discharge of the charge beneath the SMOS gate electrode which has been used was used a signal after suppression.

Although it appears that the value $0.6$ nA$_{PP}$ of the DC component of the fixed pattern noise of the conventional apparatus is smaller than the absolute value $2nA_{DC}$ of the residual offset residual current $I_{D0}$ shown in FIG. 5, since the direction of the direct current is always the same irrespective of the row of the picture elements, the DC component can readily be corrected by an external circuit, whereas the fixed pattern noise can not be corrected with a simple external circuit. Moreover, since variation of $0.6$nA$_{PP}$ can be sensed by human eyes on a fluorescent screen. For this reason, the fixed pattern noise presents rather difficult problem, so that elimination thereof is effective.

Figure 8:
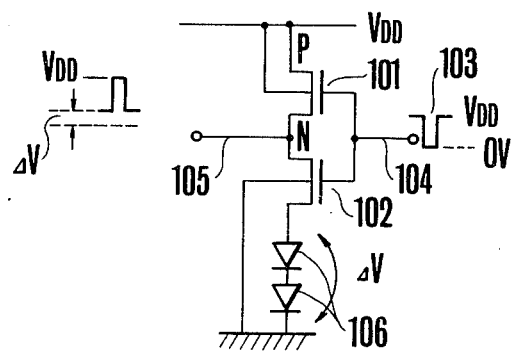
FIG. 8 is a connection diagram showing one example of a drive pulse generator of the horizontal shift register shown in FIG. 6.

FIGS. 6 and 8 show the construction of the horizontal shift register and drive circuit shown in FIGS. 3 and 4 and FIG. 7 shows the timing chart for explaining the operation. The circuit itself shown in FIG. 6 has been well known, and its principle is disclosed in Ando et al paper, Institute of Television, General Meeting Advanced Paper, pages 25 and 26, 1980.

In the circuit shown in FIG. 6, a pulse $\phi_1$ is transmitted from point N4 to a SMOS gate electrode via a line 71. In this case, $V_{SMOS.L}$ is determined by the low level 81 (see FIG. 7) of the pulse $\phi_1$ and the voltage $V_{HS}$ at the source terminal 72 of the shift register as shown in FIG. 6.

FIG. 8 shows one example of the circuit producing pulses $\phi_1$ and $\phi_2$, capable of making the low level of the pulses to be approximately equal to $V_{WPD}$ by using an integrated circuit on the same substrate or different chips and not using any special source.

In FIG. 8, 101 and 102 respectively designate P and N channel MOSFETs which are connected as a complement type inverter. A pulse $\phi_1$ or $\phi_2$ produced on an output line 105 by applying a timing pulse 103 upon a gate terminal 104 is caused to have a low level shifted in the positive direction by $\Delta V$ by diodes 106 connected to the source electrode of a NMOSFET 102.

The conditions of the pulses of the embodiment of this invention shown in FIGS. 3 and 4 can be readily realized by using a source independent of the source of the image pick-up device or a television camera, or by using a small capacitor having a capacitance of the order of $\mu\mu$ F. However, in a solid state image pick-up device and a television camera incorporated therewith which must be small and light weight, it is important to use a simple circuit as shown in FIG. 8 and does not require to incorprate any independent source into the solid state image pick-up device or the integrated circuit of the drive circuit. Although diodes can be incorporated into an integrated circuit, since they are smaller than capacitors, the diodes may be formed externally without any trouble.

As above described, in the circuit shown in FIG. 6, the low level $V_{SMOS.L}$ of the pulse impressed upon the gate electrode of a SMOS may be the low level of the pulse $\phi_1$, while the source voltage $V_{HS}$ of the shift register may be produced by using diodes as shown in FIG. 8 or may be made to be equal to the voltage $V_{WPD}$ of the semiconductor layer of the photodiodes. With regard to the upper limit of $V_{SMOS.L}$, in order to ensure the switching performance of the SMOS, the following relation must be satisfied.

$$V_{SMOS.L} < V_V + V_{SMOS.T} \qquad (2)$$

where $V_{SMOS.T}$ represents the threshold voltage of the SMOS.

However, as can be noted from the foregoing description, the object of this invention can be accomplished so long as $V_{SMOS.L}$ is nearly equal to $V_{WPD} + V_{FB}$. Where $V_{SMOS.L} \simeq V_{WPD}$, a source of a voltage $V_{WPD}$ can be used in common. In most cases $V_{SMOS.L}$ corresponds to the lower limit of the drive voltage of the horizontal shift register so that the lower is the $V_{SMOS.L}$, wider is the operating margin of the shift register. This means that a condition that the advantageous effect can be realized fully is a case wherein $V_{SMOS.L}$ is close to $V_{WPD} + V_{FB}$.

The voltage $V_{FB}$ is a parameter which is mostly influenced by the quality of the manufacturing steps. More particularly, constructions ordinarilly utilized in a solid state image pick-up apparatus are used, for example a $SiO_2$ film having a thickness of 0.01 to 0.1 micron is used as the gate insulating film, and such electroconductive material as polysilicon or molybdenum is used as the gate electrode. The voltage $V_{FB}$ is of the order of $-0.2$ V to 0 V.

For this reason, $V_{SMOS.L}$ may be selected to be equal to about $V_{WD} \pm 0.2$ V.

Although in the foregoing description a p type well layer formed on a n type substrate was described as a semiconductor layer, the semiconductor layer is not limited to such specific layer. For example, the semiconductor layer may comprise a silicon substrate formed with an insulating film on which crystals of silicon are formed, in which the insulating film is used to insulated and isolate semiconductor layers. A so-called SOS structure (silicon on saphire) can also be used.

As above described, according to this invention, in a solid state image pick-up apparatus of the type wherein a photodiode array, horizontal switching elements, a horizontal shift register, and a vertical shift register are formed on electrically insulated semiconductor layer, and in which blooming phenomenon is suppressed by accumulating electric charge beneath gate electrode when a photogate is OFF, the low level $V_{SMOS.L}$ of a pulse applied to the gate electrode of horizontal switching MOSFETs is made to satisfy a relation $V_{WPD} + V_{FB} \leq V_{SMOS.L}$, where $V_{WPD}$ represents the voltage of the semiconductor layer of the photodiodes and $V_{FB}$ represents the flat band voltage of the gate electrodes of the horiontal switching MOSFETs so as to eliminate the charge pump current of SMOSs and the fixed pattern noise caused thereby. Thus, it is possible to realize a solid state image pick-up device having a high sensitivity and a small blooming. When combined with a simple drive circuit, the image pick-up device can provide a television camera havng a small size and light weight.

What is claimed is:
1. Solid state image pick-up apparatus comprising:
a first semiconductor layer including a photoelectric conversion element array, and vertical and horizontal switching elements adapted to select said photoelectric conversion elements;

a second semiconductor layer including a horizontal shift register for selecting said horizontal switching elements;

a third semiconductor layer including a vertical shift register for selecting said vertical switching elements;

said first, second and third semiconductor layers being electricaly insulated from each other; and means for causing gate voltage $V_{SMOS.L}$ impressed upon a gate electrode of a not selected horizontal switching element to satisfy a relation $$V_{SMOS.L} \geq V_{WPD} + V_{FB}$$

where $V_{WPD}$ represents a potential of said first semiconductor layer, and $V_{FB}$ a flat band voltage beneath gate electrodes of said horizontal switching elements.

2. The apparatus according to claim 1 wherein said gate voltage $V_{SMOS.L}$ satisfies the following relation $$V_{SMOS.L} < V_V + V_{SMOS.T}$$

where $V_{SMOS.T}$ represents a threshold voltage of the horizontal switching elements, and $V_V$ a video voltage.

3. The apparatus according to claim 1 or 2 wherein each of said horizontal switching elements comprises an insulated gate type field effect transistor.

4. The apparatus according to claim 3 wherein a bias voltage is impressed upon said first semiconductor layer so as to accumulate electric charge beneath a gate electrode of a not selected vertical switching element.

5. The apparatus according to claim 1 wherein said first, second and third semiconductor layers respectively comprise well diffusion region formed on a semiconductor substrate.

6. The apparatus according to claim 1 which further comprises a circuit for producing pulses utilized to drive said horizontal shift register, said circuit comprises a P and N channel MOS field effect transistors which are connected as a complement type inverter, means for applying a timing pulse to gate electrodes of said MOS field effect transistors, and a diode connected to a source electrode of one of said MOS field effect transistors to obtain a low level voltage.

* * * * *